United States Patent [19]

Van Patten et al.

[11] 3,751,268

[45] Aug. 7, 1973

[54] METHOD OF COATING FOOD PRODUCTS WITH UNGELATINIZED UNMODIFIED HIGH AMYLOSE STARCH PRIOR TO DEEP FAT FRYING

[75] Inventors: Eric M. Van Patten, Tinley; James A. Freck, Naperville, both of Ill.

[73] Assignee: American Maize-Products Company, New York, N.Y.

[22] Filed: Jan. 14, 1972

[21] Appl. No.: 217,998

[52] U.S. Cl.......................... 99/100, 99/168, 99/103
[51] Int. Cl................................................ A23l 1/12
[58] Field of Search...................... 99/100, 168, 207, 99/107, 169

[56] References Cited
UNITED STATES PATENTS

| | | | |
|---|---|---|---|
| 3,175,914 | 3/1965 | Vahlsing | 99/100 P |
| 3,368,909 | 2/1968 | Moore | 99/168 |
| 3,424,591 | 1/1969 | Gold | 99/100 P |
| 3,425,848 | 2/1969 | Camirand | 99/168 |
| 3,427,951 | 2/1969 | Mitan | 99/168 |
| 3,527,646 | 9/1970 | Scheick | 99/168 |
| 3,597,227 | 8/1971 | Murray | 99/100 P |

*Primary Examiner*—Norman Yudkoff
*Assistant Examiner*—Martin G. Mullen
*Attorney*—Eyre, Mann & Lucas

[57] ABSTRACT

A process for preparing deep fried foods and especially french fried potatoes is disclosed. The french fries are coated with 0.1 to 1.5 percent of an unmodified ungelatinized high amylose starch having an amylose content of at least 50 percent. The resulting product has improved texture and absorbs less oil than french fries prepared by conventional methods.

9 Claims, No Drawings

METHOD OF COATING FOOD PRODUCTS WITH UNGELATINIZED UNMODIFIED HIGH AMYLOSE STARCH PRIOR TO DEEP FAT FRYING

The present invention relates to a new and useful process for the preparation of deep fried foods and especially french fried potatoes. The deep fried food is coated with from about 0.1 percent to about 1.5 percent of an unmodified ungelatinized high amylose starch having an amylose content of at least 50 percent. Thereafter, when the product is deep fried, it absorbs from about 10 percent to about 20 percent less oil than deep fried products prepared by conventional methods. Additional advantage is also obtained since the products prepared according to the present invention have improved texture and limps and sluffs are substantially reduced. By using the process of the present invention it has also been possible to make commerically acceptable french fries from raw potato stock otherwise considered unusable.

Previous attempts have been made to reduce oil absorption by french fries and to improve textural quality of finished french fried potatoes. One solution is the selection of particular raw potatoes with high specific gravity. While successful, this approach is quite expensive since it increases raw material and processing costs substantially and limits the effective processing season. A second method which has been tried is to coat the potato pieces before initial frying with a gelatinized starch solution of either a modified or unmodified starch. This practice has never proven too effective, however, and the finished product lacks uniformity. In addition, this method introduces additional cumbersome process steps since gelatinized starch solutions are difficult to handle. A third method has been to coat the potato pieces with a dilute solution of methyl cellulose before frying. This has proven generally unacceptable, however, since the coatings do not maintain their continuity especially if they are subjected to freezing and the result is a loss of crispness in the finished fry.

It has now been discovered that by coating food products to be deep fried and especially potato pieces with an ungelatinized unmodified high amylose starch having an amylose content above 50 percent, an improved product is made having the advantages as described hereinbefore. By the term "ungelatinized unmodified high amylose starch having an amylose content of at least 50 percent" it is meant those starches which have a pure amylose content of more than 50 percent and which have undergone no further physical or chemical treatment to change the properties of the refined native starch. When it is stated that the starch is ungelatinized, it is meant that less than 10 percent of the granules have lost birefringence and no marked granule swelling has occurred. High amylose starches usually gelatinize at a temperature from about 190° F. to about 198° F. The potato pieces are treated by coating them with from about 0.1 percent to about 1.5 percent (by weight of potato) of the ungelatinized unmodified high amylose starch. The preferred method of coating the potato pieces is to slurry the starch in a dip tank in its ungelatinized state. The temperature of the dip tank is maintained below the gelatinization temperature of the starch and is preferably maintained in the range from about 120° F. to about 180° F. Best results are obtained when the temperature range is from about 145° F. to about 160° F. It has been found that a starch concentration in the dip tank of from about 2.5 percent solids to about 8.0 percent solids is sufficient to coat the potato pieces with the desired pick-up of from about 0.1 percent to about 1.5 percent of the starch when the potato pieces are immersed in the starch suspension for from about 15 to about 60 seconds and preferably from about 25 to about 30 seconds.

While an immersion dip tank is the preferred method of applying the starch to the potato pieces, it will be understood that any other method of coating the potato pieces can be employed. For instance, where hot water blanchers are used in the normal processing of the potatoes, the starch can be suspended in the blanch water. Alternatively, the starch can be applied in such known ways as spraying or dusting.

After the potato pieces have been coated with the ungelatinized unmodified high amylose starch, they are immersed in an edible frying oil. The edible frying oil has a temperature above the gelatinization temperature of the starch and thus gelatinizes the starch on the surface of the potato pieces. This gelatinization forms an effective barrier against oil penetration and thus reduces the oil absorbed by the potato pieces. This is especially true at the normal deep frying temperatures of 325° F. to 380° F. since the gelatinized coating is formed very quickly at these temperatures.

The following are some specific examples of food products which have been treated and deep fried according to the present invention.

EXAMPLE 1

Kennebec potatoes from the Red River Valley were peeled and sectioned into thin shoestrings and then blanched in water for ten minutes at 150° F. Thereafter, the potato pieces were dipped into a standard sugar flume containing 1.0 percent dextrose, sugar and 1.0 percent sodium acid pyrophosphate. The sodium acid pyrophosphate is an antioxidant and improves the color of the finished fry. The flume temperature was held at 150° F. and the potato pieces had an average dwell time in the flume of 26 seconds. Thereafter, the potato pieces were removed from the sugar flume, shaken to remove excess dip solution and then deep fried for 1.5 minutes at 350° F. in hydrogenated cottonseed oil. The finished potato pieces were classified as "standard" grade according to customary industry practice. Total limps and bad textured pieces amount to an average of 22 per 100 pieces. Oil pick-up was 11 pounds per 100 pounds of finished fries.

The same procedure was repeated except that in accordance with the present invention the sugar flume solution into which the potato pieces were dipped contained, in addition to the 1.0 percent dextrose, sugar and the 1.0 percent sodium acid pyrophosphate, 6.5% solids of AMYLOMAISE VII. AMYLOMAIZE VII is an ungelatinized unmodified high amylose starch having a pure amylose content of 70 percent and is available from American Maize-Products Company. The suspension was 4.5° baume and was held at a temperature of 150° F. The potato pieces dipped into this suspension had a pick-up coating of 0.5% AMYLOMAIZE VII by weight of the finished fries. The potatoes treated with the high amylose dipped solution were classified as "fancy" grade according to customary industry practice. The total limps and bad textured pieces were only four per 100 pieces and the oil pick-up was only seven pounds per 100 pounds of finished fries.

EXAMPLE 2

Example 1 is repeated except that in accordance with the present invention the sugar flume is adjusted so that 0.1% of an ungelatinized unmodified starch having an amylose content of 50 percent is picked up by the potato pieces instead of the 0.5% of AMYLOMAIZE VII. Comparable results are obtained.

EXAMPLE 3

Example 1 is repeated except that in accordance with the present invention the sugar flume is adjusted so that 1.5% of ungelatinized unmodified pure amylose is picked up by the potato pieces instead of 0.5% of AMYLOMAIZE VII. Comparable results are obtained.

EXAMPLE 4

Example 1 is repeated except that in accordance with the present invention the AMYLOMAIZE VII is applied in a separate dip solution from the sugar flume. The percent of AMYLOMAIZE VII in the dip solution is 6.5% solids and results in a pick-up coating of 0.5% by weight of the finished fries. After the fries are removed from the AMYLOMAIZE VII dip solution they are dipped in the sugar flume solution containing 1.0% dextrose, sugar and 1.0% sodium acid pyrophosphate.

EXAMPLE 5

Idaho Russett potatoes were peeled and sectioned and then blanched in water at 150° F. for a period of 10 minutes. The potatoes were separated into two separate batches, one being a control. The other batch was drained and dipped for 30 seconds in a starch suspension comprising 5% AMYLOMAIZE VII at a temperature of 165° F. The potatoes were removed from the dip bath and were shaken to remove the excess dip solution. Pickup of AMYLOMAIZE VII averaged 0.3% by weight of the finished fries. The control batch was not subjected to any further processing step.

Each of the batches was then deep fried for 2 minutes at 375° F. in a hydrogenerated cottonseed oil bath. Each of the batches was then shaken to remove excess surface oil and thereafter was frozen in a plate-type deep freezer. After one week's storage the two batches were removed from the freezer and were given a final deep fry for two minutes at 375° F. in hydrogenated cottonseed oil.

The oil pick-up determined by the standard "Ross Treadway" method for the control batch of potatoes averaged 12.15 percent while the oil pick-up for the potato pieces treated in accordance with the present invention averaged only 10.8 percent. In addition, the control batch had total limps and bad textured pieces of 18 to 100 pieces whereas the potato pieces treated in accordance with the present invention had total limps and bad textured pieces of only five per 100 pieces.

EXAMPLE 6

Example 5 is repeated except that the temperature of the dip bath is maintained at 120° F. rather than 165° F. Comparable results are obtained.

EXAMPLE 7

Example 5 is repeated except that the temperature of the dip bath is maintained at 180° F. rather than 165° F. Comparable results are obtained.

It will be understood that the claims are intended to cover all changes and modifications of the preferred embodiments of the invention, herein chosen for the purpose of illustration, which do not constitute departures from the spirit and scope of the invention.

What is claimed is:

1. In the process of deep frying food products the improvement which comprises coating said food products with from about 0.1% to about 1.5% by weight of the food product of an ungelatinized unmodified high amylose starch having an amylose content of at least 50 percent and thereafter gelatinizing said high amylose starch.

2. The process of claim 1 wherein the food product is a potato piece.

3. The process of claim 1 wherein the ungelatinized unmodified high amylose starch is applied by dipping the food product in a slurry having a concentration of from about 2.5 percent solids to about 8.0 percent solids.

4. The process of claim 3 wherein the slurry is maintained at a temperature from about 120° F. to about 180° F.

5. The process of claim 3 wherein the slurry is maintained at a temperature from about 145° F. to about 160° F.

6. The process of claim 1 wherein the high amylose starch has an amylose content of at least about 70 percent.

7. The process of deep frying potato pieces which comprises:
   a. peeling and sectioning said potatoes;
   b. coating the sectioned potato pieces with from about 0.1% to about 1.5% by weight of the potato pieces of an ungelatinized unmodified high amylose starch having an amylose content of at least 50 percent; and
   c. deep frying the coated potato pieces in an edible frying oil at a temperature above the gelatinization temperature of said ungelatinized unmodified high amylose starch.

8. The process of claim 7 wherein the sectioned potato pieces are blanched in aqueous solution after step (a).

9. The process of claim 8 wherein the ungelatinized unmodified high amylose starch is in the aqueous solution whereby the sectioned potato pieces are coated with said ungelatinized unmodified high amylose starch.

* * * * *